US011122768B2

(12) United States Patent
Önnheim et al.

(10) Patent No.: US 11,122,768 B2
(45) Date of Patent: Sep. 21, 2021

(54) METHOD AND SYSTEM FOR PROCESSING MILK

(71) Applicant: Tetra Laval Holdings & Finance S.A., Pully (CH)

(72) Inventors: Magnus Önnheim, Lund (SE); Anna Loserius, Bjärred (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/956,602

(22) PCT Filed: Dec. 17, 2018

(86) PCT No.: PCT/EP2018/085129
§ 371 (c)(1),
(2) Date: Jun. 21, 2020

(87) PCT Pub. No.: WO2019/121464
PCT Pub. Date: Jun. 27, 2019

(65) Prior Publication Data
US 2020/0375141 A1 Dec. 3, 2020

(30) Foreign Application Priority Data
Dec. 22, 2017 (EP) .................... 17210304

(51) Int. Cl.
*A01J 11/12* (2006.01)
*A23C 9/142* (2006.01)
*A23C 9/15* (2006.01)

(52) U.S. Cl.
CPC ............. *A01J 11/12* (2013.01); *A23C 9/1422* (2013.01); *A23C 9/1508* (2013.01)

(58) Field of Classification Search
CPC ....................................................... A01J 11/12
(Continued)

(56) References Cited

U.S. PATENT DOCUMENTS

| 3,983,257 | A | 9/1976 | Malmberg |
| 5,260,079 | A | 11/1993 | Zettier |
| 2017/0354160 | A1 | 12/2017 | Doring |

FOREIGN PATENT DOCUMENTS

| DE | 32 38 462 A1 | 4/1984 |
| WO | 98/57549 A1 | 12/1998 |

(Continued)

OTHER PUBLICATIONS

International Search Report for corresponding Application No. PCT/EP2018/085129, dated Jul. 2, 2020.
(Continued)

*Primary Examiner* — Brent T O'Hern
(74) *Attorney, Agent, or Firm* — Renner, Otto, Boisselle & Sklar, LLP

(57) ABSTRACT

A method for processing milk, including separating raw milk into cream and skim milk, determining protein contents in the skim milk and the cream, dividing the skim milk into a first skim milk portion and a second skim milk portion, filtering the second skim milk portion into a permeate and a protein rich retentate, determining protein content in the permeate, calculating which flow rates are required for the first skim milk portion, the cream remix portion and the permeate to obtain a predetermined protein content of a mixture of the first skim milk portion, the cream remix portion and the permeate, which together form a standardized milk product.

15 Claims, 3 Drawing Sheets

(58) Field of Classification Search
USPC .......................................................... 99/289
See application file for complete search history.

(56) References Cited

FOREIGN PATENT DOCUMENTS

| WO | WO-2006089527 A1 * | 8/2006 | ............... A23C 7/02 |
| WO | WO-2016096106 A1 * | 6/2016 | ........... A23C 9/1422 |

OTHER PUBLICATIONS

International Search Report for corresponding Application No. PCT/EP2018/085129, dated Feb. 5, 2019.
Extended European Search Report for corresponding Application No. 17210304.6, dated Mar. 14, 2018.

* cited by examiner

METHOD AND SYSTEM FOR PROCESSING MILK

TECHNICAL FIELD

The invention generally relates to the field of milk processing. More particularly, the invention relates to protein standardization of milk.

BACKGROUND ART

Today it is well known to fat standardize milk by first separating raw milk into cream and skim milk by using a centrifugal separator, and then remix a part of the cream into the skim milk in a controlled manner such that a precise fat content can be achieved. In a modern milk processing system, this process is often fully automated and by having pressure transmitters and flow transmitters placed in different parts of the system, a precise fat content of a resulting milk product can be achieved even though e.g. a fat content of the raw milk fluctuates.

A more recent development within the dairy processing industry is protein standardization. Combining fat and protein standardization comes with a number of challenges since the underlying technologies have different demands in terms of the required equipment and how the combined standardization is controlled. For this reason there is a demand for milk processing systems that are capable of providing fat as well as protein standardization in a cost efficient manner including but not limited to equipment cost, running cost and running time.

SUMMARY

It is an object of the invention to at least partly overcome one or more of the above-identified limitations of the prior art. In particular, it is an object to provide a method and a system capable of efficiently providing protein standardization.

According to a first aspect it is provided a method for processing milk, said method comprising separating raw milk RM into cream C and skim milk SM, wherein the cream C is fed to a main cream pipe and the skim milk SM is fed to a main skim milk pipe, determining protein content in the skim milk SM, determining protein content in the cream C, dividing the cream C in the main cream pipe into a cream remix portion CR fed into a cream remix pipe and a surplus cream portion SC fed into a surplus cream pipe, dividing the skim milk SM in the main skim milk pipe into a first skim milk portion SM1 fed into a first skim milk pipe and a second skim milk portion SM2 fed into a second skim milk pipe, filtering, by using a filtration device, the second skim milk portion SM2 into a permeate P fed into a permeate pipe and a retentate R fed into a retentate pipe 130, such that the retentate R has a higher protein content than the permeate P, determining protein content in the permeate P, calculating, based on the protein contents of at least the skim milk SM, the cream remix portion CR and the permeate P, flow rates $Q_{SM1}$, $Q_{CR}$, $Q_P$ that are required for the first skim milk portion SM1, the cream remix portion CR and the permeate P to obtain a predetermined protein content of a mixture of the first skim milk portion SM1, the cream remix portion CR and the permeate P, controlling a set of valves that are arranged to regulate the flow of the first skim milk portion SM1, the cream remix portion CR and the permeate P, such that said calculated flow rates $Q_{SM1}$, $Q_{CR}$, $Q_P$ are obtained, and combining at least the first skim milk portion SM1, the permeate P and the cream remix portion CR into a standardized milk product SMP.

The method may further comprise diverting at least a portion SR of the retentate via a surplus retentate pipe connected to the retentate pipe.

The method may further comprise diverting at least a portion SP of the permeate via a surplus permeate pipe connected to the permeate pipe.

The step of combining may further comprise combining at least of portion R of the retentate with the first skim milk portion SM1, the permeate P and the cream remix portion CR, to thereby adjust the protein content of the standardized milk product SMP.

The method may further comprise: determining fat content in the cream C;

determining fat content in the skim milk SM; wherein the calculating of said flow rates $Q_{SM1}$, $Q_{CR}$, $Q_P$ is based also on the fat content of the cream C and the fat content of the skim milk SM, to obtain a predetermined fat content of the standardized milk product SMP formed by the combining of the first skim milk portion SM1, the cream remix portion CR and the permeate P.

A temperature of the second skim milk portion SM2 may be 3-25 Celsius degrees.

The method may further comprise feeding the standardized milk product SMP to a heat treatment apparatus.

According to a second aspect it is provided a system for processing milk. The system comprises a separator arranged to receive raw milk RM via a raw milk pipe and to feed cream C into a main cream pipe and skim milk SM into a main skim milk pipe, a skim milk protein content determining device arranged to determine protein content in the skim milk SM, a cream protein content determining device arranged to determine protein content in the cream C, wherein the cream C in the main cream pipe is divided into a cream remix portion CR fed into a cream remix pipe and a surplus cream portion SC fed into a surplus cream pipe, wherein the skim milk SM in the main skim milk pipe is divided into a first skim milk portion SM1 fed into a first skim milk pipe and a second skim milk portion SM2 fed into a second skim milk pipe, a filtration device arranged to filter the second skim milk portion SM2 into a permeate P fed into a permeate pipe and a retentate R fed into a retentate pipe (130), such that the retentate R has a higher protein content than the permeate P, a permeate P protein content determining device arranged to determine protein content in the permeate P, a control arrangement configured to, based on the protein contents of at least the first skim milk portion SM1, the cream remix portion CR and the permeate P, calculate flow rates $Q_{SM1}$, $Q_{CR}$, $Q_P$ that are required for the first skim milk portion SM1, the cream remix portion CR and the permeate P to obtain a predetermined protein content of a mixture of the first skim milk portion SM1, the cream remix portion CR and the permeate P, a set of valves arranged to regulate the flow of the first skim milk portion (SM1), the cream remix portion CR and the permeate P, such that said calculated flow rates $Q_{SM1}$, $Q_{CR}$, $Q_P$ are obtained, wherein the control arrangement is further configured to control the set of valves that are arranged to regulate the flow of the first skim milk portion SM1, the cream remix portion CR and the permeate P, such that said calculated flow rates $Q_{SM1}$, $Q_{CR}$, $Q_P$ are obtained, and a standardized product pipe, wherein the first skim milk pipe, the permeate pipe and the cream surplus pipe feed into the standardized product pipe such that at least the first skim milk portion SM1, the permeate P and the cream remix portion CR are combined into a standardized milk product SMP.

The system may further comprise a surplus retentate pipe provided on the retentate pipe.

The system may further comprise a surplus permeate pipe provided on the permeate pipe.

The retentate pipe may feed into the standardized product pipe such that at least a portion R of the retentate can be combined with the first skim milk portion SM1, the permeate P and the cream remix portion CR, to thereby adjust the protein content of the standardized milk product SMP.

The system may further comprise: a cream fat content determining device configured to determine a fat content in the cream C; a skim milk fat content determining device configured to determine a fat content in the skim milk SM; wherein the control arrangement may be further configured to calculate the flow rates $Q_{SM1}$, $Q_{CR}$, $Q_P$ based also on the fat content of the cream C and the fat content of the skim milk SM, to obtain a predetermined fat content of the standardized milk product SMP formed by combining the first skim milk portion SM1, the cream remix portion CR and the permeate P.

The system may further be configured to directly feed the standardized milk product SMP to an ultra-high temperature UHT treatment apparatus.

A temperature of the second skim milk portion SM2 may be 3-25 Celsius degrees.

According to a third aspect it is provided a control arrangement for controlling a system comprising a separator arranged to receive raw milk RM via a raw milk pipe and to feed cream C into a main cream pipe and skim milk SM into a main skim milk pipe, wherein the cream C in the main cream pipe is divided into a cream remix portion CR fed into a cream remix pipe and a surplus cream portion SC fed into a surplus cream pipe, wherein the skim milk SM in the main skim milk pipe is divided into a first skim milk portion SM1 fed into a first skim milk pipe and a second skim milk portion SM2 fed into a second skim milk pipe, a filtration device arranged to filter the second skim milk portion SM2 into a permeate P fed into a permeate pipe and a retentate R fed into a retentate pipe, such that the retentate (R) has a higher protein content than the permeate, a set of valves arranged to regulate the flow of the first skim milk portion SM1, the cream remix portion CR and the permeate P, such that said calculated flow rates $Q_{SM1}$, $Q_{CR}$, $Q_P$ are obtained, a standardized product pipe, wherein the first skim milk pipe, the permeate pipe and the cream surplus pipe feed into the standardized product pipe such that at least the first skim milk portion SM1, the permeate P and the cream remix portion CR are combined into a standardized milk product SMP, said control arrangement comprises a data receiver configured to receive input data related to a protein content of cream C, a protein content of skim milk SM, and a protein content of permeate P, a data processor configured to determine control signals for a set of valves by calculating, based on the protein contents of at least the skim milk SM, the cream remix portion CR and the permeate P, flow rates $Q_{SM1}$, $Q_{CR}$, $Q_P$ that are required for a first skim milk portion SM1, a cream remix portion CR and the permeate P to obtain a predetermined protein content of a mixture of the first skim milk portion SM1, the cream remix portion CR and the permeate P, a control signal output device configured to output the control signals to the set of valves that are arranged to regulate the flow of the first skim milk portion SM1, the cream remix portion CR and the permeate P, such that said calculated flow rates $Q_{SM1}$, $Q_{CR}$, $Q_P$ are obtained.

Any feature and embodiment of the method described herein may be implemented for the system, and vice versa. Further objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1 schematically illustrates a system for processing milk.

DETAILED DESCRIPTION

Figure 1:
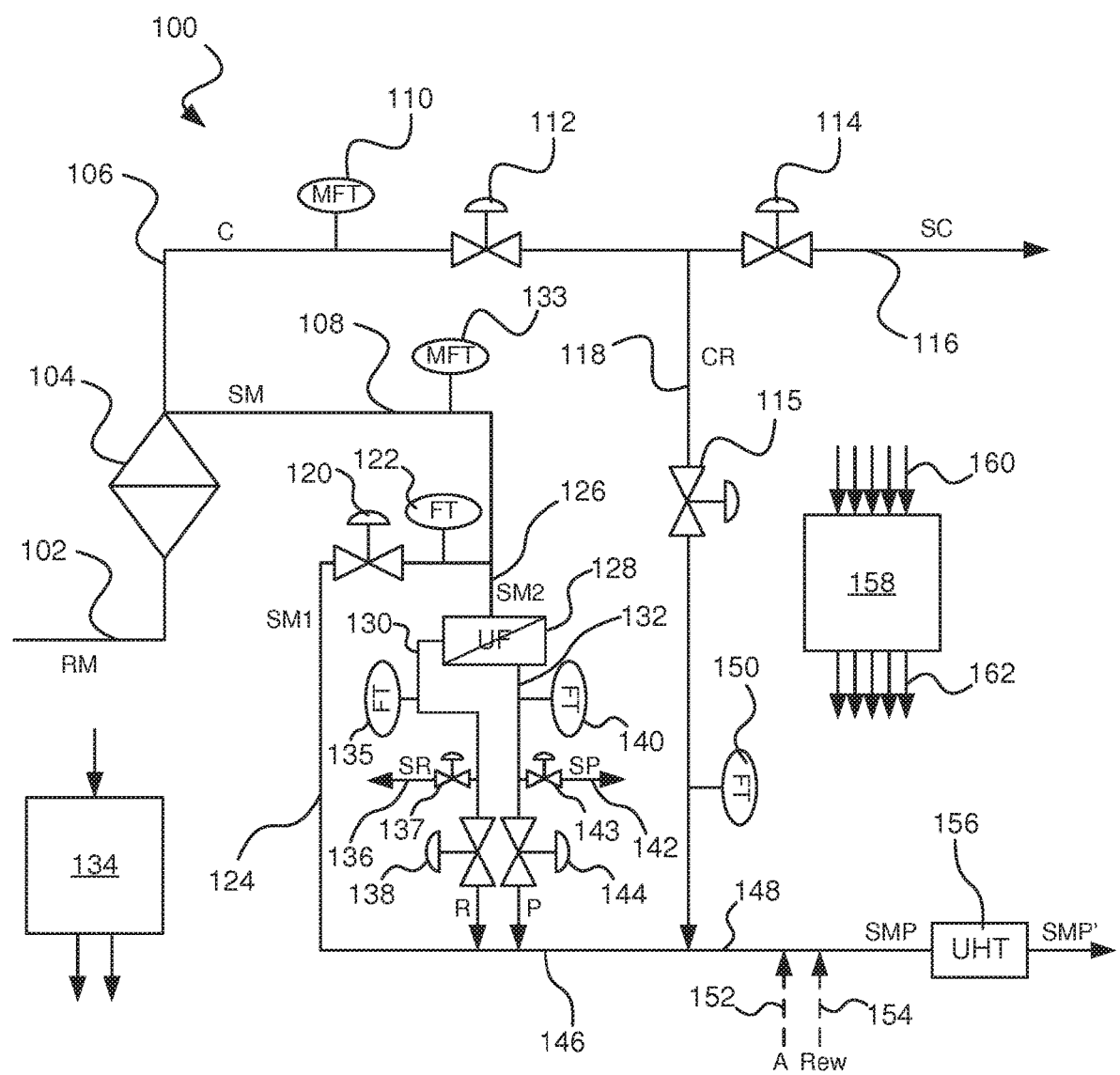

With reference to FIG. 1 a system 100 for processing milk is illustrated by way of example. Raw milk RM is fed into the system 100 in a raw milk pipe 102 to a separator 104. The separator 104, which may be a centrifugal separator, is arranged to separate the raw milk RM into cream C fed into a main cream pipe 106 and skim milk SM fed into a main skim milk pipe 108.

A protein content of the cream C can be determined by a cream protein content measuring device 110 arranged in the main cream pipe 106. The cream protein content measuring device 110 may be a mass-flow transmitter or any other sensor that is suitable to be used for determining protein content. Determining protein content per se may be done according to conventional techniques.

In order to regulate a flow rate of the cream C in the main cream pipe 106 a main cream valve 112 may be provided in the main cream pipe 106. In addition to regulating the flow rate, the main cream valve 106 may also be used for assuring that a pressure in the main cream pipe 106 upstream the main cream valve 112 is within a working pressure range for the separator 104.

The cream C is divided into surplus cream portion SC that is fed further in the main cream pipe 106, and into cream remix portion CR. A flow rate of the surplus cream portion SC may be regulated by using a surplus cream valve 114 and a flow rate of the cream remix portion CR can be regulated by using a cream remix valve 115. The surplus cream valve 114 may be placed in a surplus cream pipe 116 and the cream remix portion valve 115 may be placed in a cream remix pipe 118.

The skim milk SM is divided into a first skim milk portion SM1 and a second skim milk portion SM2. A flow rate of the first skim milk portion SM1 may be regulated by using a first skim milk valve 120 and the flow rate of the first skim milk portion SM1 may be monitored by a first skim milk flow transmitter 122. The first skim milk portion SM1 is fed into a first skim milk pipe 124 and the second skim milk portion SM2 is fed into a second skim milk pipe 126. The first skim milk pipe 124 is by-passing a filtration device 128, which may be an ultrafiltration device, while the second skim milk portion SM2 is fed into the filtration device 128 and subjected to filtration. The filtration device 128 may be any conventional type of filter that is capable of filtering milk protein to a retentate feed, such that a permeate feed passing the filtration device 128 is substantially free from both protein and fat, i.e. the retentate holds basically all protein and fat that was present in the second skim milk portion SM2.

During the filtration a retentate R and a permeate P are formed. The retentate R is fed into a retentate pipe 130 and the permeate P is fed into a permeate pipe 132. An effect of the filtration is that the retentate R has a higher protein content than the permeate P. As indicated, it can be determined that the retentate R holds basically all protein and fat that was present in the second skim milk portion SM2, i.e. that the permeate P holds essentially no (less than 0.05 wt %) protein and essentially no (less than 0.05 wt %) fat. Herein, wt % refers to weight percentage.

In order to determine the protein contents of the retentate R and the permeate P, protein content measuring devices may be provided on the retentate pipe 130 and the permeate pipe 132. Alternatively, as illustrated in FIG. 1, since the protein contents of the retentate R and the permeate P can be determined for a given input to the filtration device 128, a protein content of the skim milk SM can be determined by a skim milk protein measuring device 133 placed in the main skim milk pipe 108, and provided to a data processing device 134 that is configured to determine the protein contents of the retentate R and the permeate P based on the flow rates of the retentate R and permeate P, and the protein content of the skim milk SM. For example, if the flow rates of the retentate R and the permeate P are equal and the protein content of the skim milk SM is 3.5 wt %, then the protein content if the retentate R can be determined to 7 wt % while that of the permeate P can be determined to 0 wt %.

The retentate pipe 130 can be provided with a flow transmitter 135 such that a flow rate of the retentate R can be measured. Further, in case retentate R is to be diverted from the system 100, a surplus retentate SR pipe 136 can be provided. A surplus retentate SR valve 137 may be provided in the surplus retentate pipe 136 in order to control a surplus retentate flow rate. Further, the retentate pipe 130 can be provided with a retentate valve 138 for regulating a retentate flow rate. An advantage with this is that excessive protein rich retentate may be diverted from the system 100 and used in other products.

The permeate pipe 132 can be provided with a permeate flow transmitter 140 for measuring a flow rate of the permeate P. Further, the permeate pipe 132 can be provided with a surplus permeate SP pipe 142 provided with a surplus permeate valve 143 for controlling a flow rate of surplus permeate SP. Further, the permeate pipe 132 can be provided with a permeate valve 144 for regulating a permeate flow rate. An advantage with this is that excessive sugar rich permeate may be diverted from the system 100 and used in other products.

In order to form a standardized milk product SMP with a predetermined protein content and a predetermined fat content, the first skim milk portion SM1, the permeate P and optionally the retentate R can be combined into a skim milk combination. This may be achieved by that the first skim milk pipe 124, the retentate pipe 130 and the permeate pipe 132 feed into a skim milk combination pipe 146.

The skim milk combination pipe 146 can in turn feed into a cream and skim milk combination pipe 148 together with the cream remix pipe 118. By adjusting a cream remix flow rate of the cream remix CR in the cream remix pipe 118, fat content of a cream and skim milk combination in the cream and skim milk combination pipe 148 can be adjusted. Since the cream remix CR also comprises protein, the flow rates and the protein contents of the first skim milk portion SM1, the permeate P and optionally the retentate R, respectively, can be adjusted such that a cream and skim milk combination in the cream and skim milk pipe 148 meets the predetermined protein content and fat content. In order to measure the flow rate of the cream remix CR a flow transmitter 150 can be provided on the cream remix pipe 118.

Optionally, additives, such as cacao, vitamins or the like, may be added to the cream and skim milk combination via an additives pipe 152. An advantage with this is that the additives that may be negatively affect by the filtration can be added after filtration has taken place.

Optionally, rework, e.g. product residues captured in connection with flushing the system 100 before a cleaning operation, may be added to the cream and skim milk combination via a rework pipe 154. An advantage with this is that the product losses can be reduced.

The standardized milk product SMP in the cream and skim milk combination pipe 148 can be fed directly into a heat treatment apparatus 156, that is without having a buffer tank. The heat treatment apparatus 156 may be an ultra-high temperature (UHT) treatment apparatus arranged to heat treat the standardized milk product SMP and to feed out a heat treated standardized milk product SMP'. The protein content in wt % of the heat treated standardized milk product SMP' is the sum of the protein (in weight) of all components that form the standardized milk product SMP', i.e. at least the first skim milk portion SM1, the permeate P and the cream remix CR, divided by the total weight of these components.

In order to control the flow rates such that the standardized milk product SMP with the predetermined fat and protein content is achieved, a control arrangement 158 can be used. The control arrangement 158 can be configured to, based on input data 160 comprising the protein contents of at least the first skim milk portion SM1, the cream remix portion CR and the permeate P, calculate flow rates $Q_{SM1}$, $Q_{CR}$, $Q_P$ that are required for the first skim milk portion SM1, the cream remix portion CR and the permeate P to obtain a predetermined protein content of a mixture of the first skim milk portion SM1, the cream remix portion CR and the permeate P, also referred to as the standardized milk product SMP. Further, the control arrangement can be configured to control via control signals 162 a set of valves 112, 114, 115, 120, 138, 144, such as the main cream valve 112, the surplus cream valve 114, the cream remix valve 115, the first skim milk valve 120, the retentate valve 138, and/or the permeate valve 144, that are arranged to regulate the flow of the first skim milk portion SM1, the cream remix portion CR and the permeate P, such that said calculated flow rates $Q_{SM1}$, $Q_{CR}$, $Q_P$ are obtained. The data processing device 134 may be integrated as a component in the control arrangement 158.

An advantage with the system 100 is that the raw milk RM can first be subjected to separation, filtration and fat and protein standardization at a temperature interval that is not requiring heating of the raw milk RM, which has the positive effects of lower equipment cost and less floor space requirement.

Another advantage is that the raw milk RM must not be heated, i.e. raw milk RM may have a temperature in the range of 3-25 degrees Celsius, or 6-12 degrees Celsius, when entering the separator 104. This may reduce a risk for bacterial growth compared to hot milk separation, in turn providing for that longer running times are made possible, which positively affects the operational cost.

A further advantage by the system 100 is that only the second skim milk SM2 is subjected to filtration. This is advantageous in that less milk is subjected to filtration, which affects the operational cost positively.

Still an advantage is that by having the possibility to divert surplus retentate SR it is possible to transfer valuable protein that is not required for meeting the predetermined protein content of the standardized milk product SMP from the system 100, such that this can be used in other products.

Further, as indicated above, as an effect of how the system 100 is arranged, a need for buffer tanks is reduced.

Figure 2:
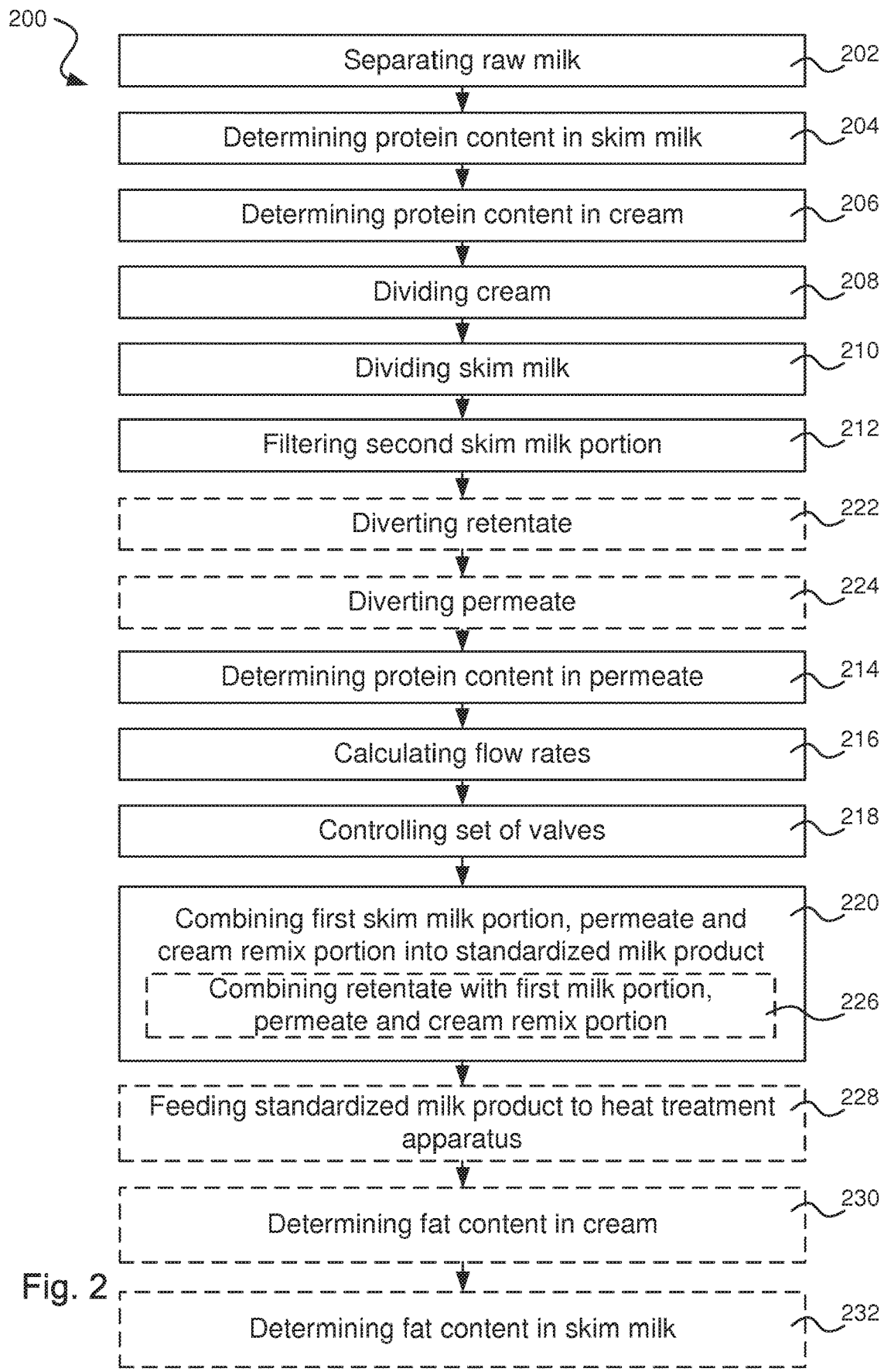
FIG. 2 is a flow chart illustrating steps in a method for processing milk.

FIG. 2 is a flowchart illustrating steps of a method 200 for processing milk. The method may be performed on, for example, the system 100 described in connection with FIG. 1

In a first step 202 of the method 200, the raw milk RM can be separated into the cream C and the skim milk SM. As illustrated in FIG. 1, this may be made by using the separator 104.

In a second step 204, the protein content of the skim milk SM can be determined. This may be made by using the skim milk protein content measuring device 133.

In a third step 206, the protein content of the cream C can be determined. This may be made by using the cream protein content measuring device 110.

In a fourth step 208, the cream C can be divided into the cream remix portion CR and the surplus cream portion SC.

In a fifth step 210, the skim milk SM can be divided into the first skim milk portion SM1 and the second skim milk portion SM2.

In a sixth step 212, the second skim milk portion SM2 can be filtered such that the permeate P and the retentate R are formed.

In a seventh step 214, the protein content in the permeate P can be determined. This may be made by using a permeate protein measuring device, but it may also be determined based on the protein content of the skim milk SM that is subjected to filtration as described above. In practice, the protein content in the permeate P can, without performing any calculations or measurements, be determined (estimated) to be zero, since available filtration devices are so efficient that any protein that passes the filtration device may be ignored. Also, the filtration device 128 filters basically all fat to the retentate, i.e. the fat content of the permeate can be determined to be zero.

In an eighth step 216, flow rates to be set for the set of valves 112, 114, 115, 120, 138, 144 can be calculated. More specifically, in order to calculate the flow rates $Q_{SM1}$, $Q_{CR}$, $Q_P$ that are required for the first skim milk portion SM1, the cream remix portion CR and the permeate P for achieving the standardized milk product SMP with the predetermined fat and protein content, the protein contents of at least the first skim milk portion SM1, the cream remix portion CR and the permeate P, can be used as input data.

In a ninth step 218, the set of valves 112, 114, 115, 120, 138, 144 that are arranged to regulate the flow of the first skim milk portion SM1, the cream remix portion CR and the permeate P, are controlled such that said calculated flow rates $Q_{SM1}$, $Q_{CR}$, $Q_P$ are obtained.

In a tenth step 220, at least the first skim milk portion SM1, the permeate P and the cream remix portion CR are combined into a standardized milk product SMP.

Optionally, in an eleventh step 222, surplus retentate SR may be diverted from the system 100.

Optionally, in a twelfth step 224, surplus permeate SP may be diverted from the system 100.

Optionally, the tenth step 220 may comprise a sub-step 226. In the sub-step 226 at least a portion of the retentate R can be combined with the first skim milk portion SM1, the permeate P and the cream remix portion CR in order to adjust the protein content of the standardized milk product SMP.

Optionally, in a thirteenth step 228, the standardized milk product SMP is fed to the heat treatment apparatus 156.

Optionally, in fourteenth step 230, the fat content of the cream C can be determined, and in a fifteenth step 232 the fat content of the skim milk SM can be determined. Having this information, the calculating in the eighth step 216 can also be based on the fat content of the cream C and the fat content of the skim milk SM, for the purpose of obtaining also a predetermined fat content of the standardized milk product SMP.

Figure 3:
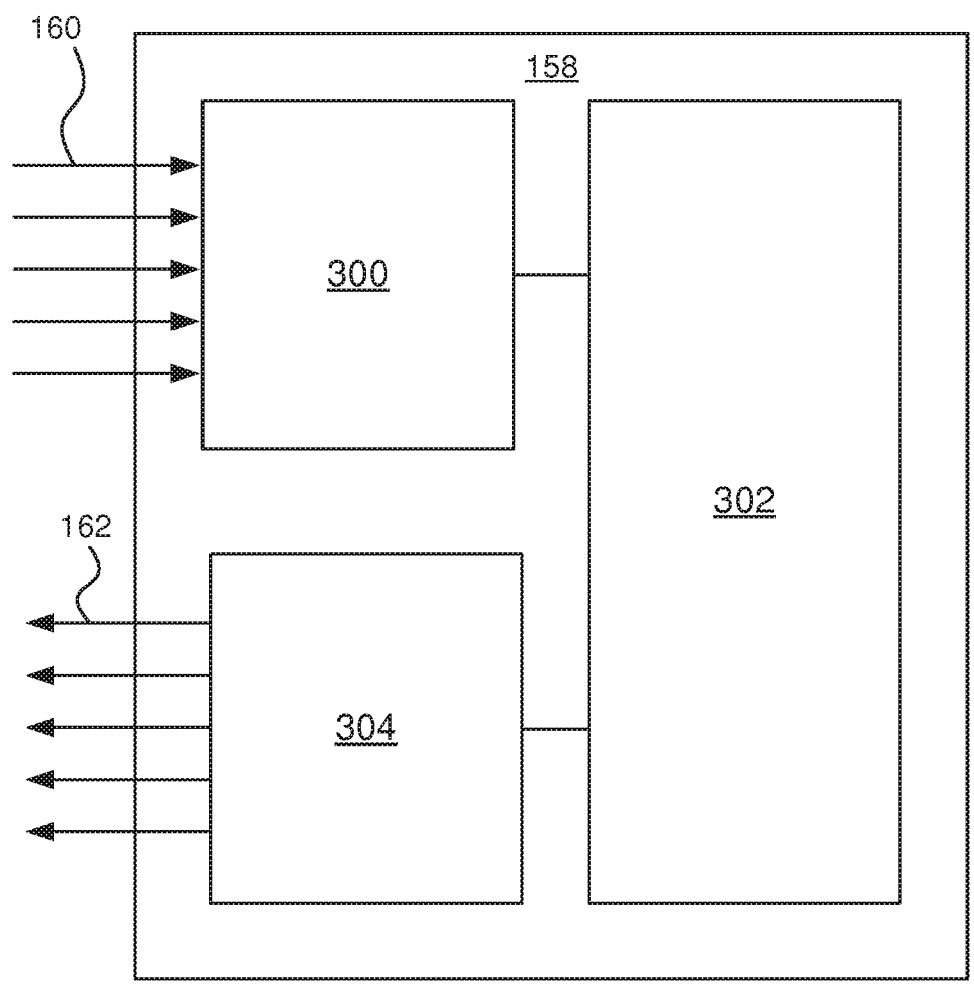
FIG. 3 illustrates a control arrangement configured to control valves of a system for processing milk.

FIG. 3 schematically illustrates the control arrangement 158 in further detail. The control arrangement 158 can comprise a data receiver 300 configured to receive the input data 160 related to the protein content of cream C, the protein content of skim milk SM, and the protein content of permeate P. A data processor 302 configured to determine control signals 162 for the set of valves 112, 114, 115, 120, 138, 144 can be provided. The control signals 162 can be determined by calculating, based on the protein contents of at least the skim milk SM, the cream remix portion CR and the permeate P, the flow rates $Q_{SM1}$, $Q_{CR}$, $Q_P$ that are required for the first skim milk portion SM1, the cream remix portion CR and the permeate P to obtain the predetermined protein content of a mixture of the first skim milk portion SM1, the cream remix portion CR and the permeate P, also referred to as the standardized milk product SMP. Further a control signal output device 304 can be provided. This can be configured to output the control signals 162 to the set of valves 112, 114, 115, 120, 138, 144 that are arranged to regulate the flow of the first skim milk portion SM1, the cream remix portion CR and the permeate P, such that said calculated flow rates $Q_{SM1}$, $Q_{CR}$, $Q_P$ are obtained.

From the description above follows that, although various embodiments of the invention have been described and shown, the invention is not restricted thereto, but may also be embodied in other ways within the scope of the subject-matter defined in the following claims.

The invention claimed is:

1. A method for processing milk, said method comprising:
   separating raw milk into cream and skim milk, wherein the cream is fed to a main cream pipe and the skim milk is fed to a main skim milk pipe,
   determining protein content in the skim milk,
   determining protein content in the cream,
   dividing the cream in the main cream pipe into a cream remix portion fed into a cream remix pipe and a surplus cream portion fed into a surplus cream pipe,
   dividing the skim milk in the main skim milk pipe into a first skim milk portion fed into a first skim milk pipe and a second skim milk portion fed into a second skim milk pipe,
   filtering, by using a filtration device, the second skim milk portion into a permeate fed into a permeate pipe and a retentate fed into a retentate pipe, such that the retentate has a higher protein content than the permeate,
   determining protein content in the permeate, calculating, based on the protein contents of the skim milk, the cream remix portion and the permeate, flow rates that are required for the first skim milk portion, the cream remix portion and the permeate to obtain a predetermined protein content of a mixture of the first skim milk portion, the cream remix portion and the permeate, controlling a set of valves that are arranged to regulate a flow of the first skim milk portion, the cream remix portion and the permeate, such that said calculated flow rates are obtained, and combining at least the first skim milk portion, the permeate and the cream remix portion into a standardized milk product.

2. The method according to claim 1, comprising diverting at least a portion of the retentate via a surplus retentate pipe connected to the retentate pipe.

3. The method according to claim 1, comprising
diverting at least a portion of the permeate via a surplus permeate pipe connected to the permeate pipe.

4. The method according to claim 1, wherein the combining comprises
combining at least of portion of the retentate with the first skim milk portion, the permeate and the cream remix portion, to thereby adjust a protein content of the standardized milk product.

5. The method according to claim 1, comprising
determining fat content in the cream,
determining fat content in the skim milk,
wherein the calculating of said flow rates is based also on the fat content of the cream and the fat content of the skim milk, to obtain a predetermined fat content of the standardized milk product formed by the combining of the first skim milk portion, the cream remix portion and the permeate.

6. The method according to claim 1, wherein a temperature of the second skim milk portion is 3-25 degrees Celsius.

7. The method according to claim 1, further comprising
feeding the standardized milk product to a heat treatment apparatus.

8. A system for processing milk, said system comprising:
a separator arranged to receive raw milk via a raw milk pipe and to feed cream into a main cream pipe and skim milk into a main skim milk pipe,
a skim milk protein content determining device arranged to determine protein content in the skim milk,
a cream protein content determining device arranged to determine protein content in the cream,
wherein the cream in the main cream pipe is divided into a cream remix portion fed into a cream remix pipe and a surplus cream portion fed into a surplus cream pipe,
wherein the skim milk in the main skim milk pipe is divided into a first skim milk portion fed into a first skim milk pipe and a second skim milk portion fed into a second skim milk pipe,
a filtration device arranged to filter the second skim milk portion into a permeate fed into a permeate pipe and a retentate fed into a retentate pipe, such that the retentate has a higher protein content than the permeate,
a permeate protein content determining device arranged to determine protein content in the permeate,
a control arrangement configured to, based on the protein contents of the first skim milk portion, the cream remix portion and the permeate, calculate flow rates that are required for the first skim milk portion, the cream remix portion and the permeate to obtain a predetermined protein content of a mixture of the first skim milk portion, the cream remix portion and the permeate, a set of valves arranged to regulate a flow of the first skim milk portion, the cream remix portion and the permeate, such that said calculated flow rates are obtained, wherein the control arrangement is further configured to control the set of valves that are arranged to regulate the flow of the first skim milk portion, the cream remix portion and the permeate, such that said calculated flow rates are obtained, and a standardized product pipe, wherein the first skim milk pipe, the permeate pipe and the cream surplus pipe feed into the standardized product pipe such that at least the first skim milk portion, the permeate and the cream remix portion are combined into a standardized milk product.

9. The system according to claim 8, further comprising a surplus retentate pipe provided on the retentate pipe.

10. The system according to claim 8, further comprising a surplus permeate pipe provided on the permeate pipe.

11. The system according to claim 8, wherein the retentate pipe feed into the standardized product pipe such that at least a portion of the retentate can be combined with the first skim milk portion, the permeate and the cream remix portion, to thereby adjust a protein content of the standardized milk product.

12. The system according to claim 8, further comprising
a cream fat content determining device configured to determine a fat content in the cream,
a skim milk fat content determining device configured to determine a fat content in the skim milk,
wherein the control arrangement is further configured to calculate the flow rates based also on the fat content of the cream and the fat content of the skim milk, to obtain a predetermined fat content of the standardized milk product formed by combining the first skim milk portion, the cream remix portion and the permeate.

13. The system according to claim 8, wherein the system is configured to directly feed the standardized milk product to a ultra-high temperature treatment apparatus.

14. The system according to claim 8, wherein a temperature of the second skim milk portion is 3-25 Celsius degrees.

15. A control arrangement for controlling a system comprising a separator arranged to receive raw milk via a raw milk pipe and to feed cream into a main cream pipe and skim milk into a main skim milk pipe, wherein the cream in the main cream pipe is divided into a cream remix portion fed into a cream remix pipe and a surplus cream portion fed into a surplus cream pipe, wherein the skim milk in the main skim milk pipe is divided into a first skim milk portion fed into a first skim milk pipe and a second skim milk portion fed into a second skim milk pipe,
a filtration device arranged to filter the second skim milk portion into a permeate fed into a permeate pipe and a retentate fed into a retentate pipe, such that the retentate has a higher protein content than the permeate,
a set of valves arranged to regulate a flow of the first skim milk portion, the cream remix portion and the permeate, such that said calculated flow rates are obtained,
a standardized product pipe, wherein the first skim milk pipe, the permeate pipe and the cream surplus pipe feed into the standardized product pipe such that at least the first skim milk portion, the permeate and the cream remix portion are combined into a standardized milk product,
said control arrangement comprising a data receiver configured to receive input data related to a protein content of cream, a protein content of skim milk, and a protein content of permeate, a data processor configured to determine control signals for a set of valves by calculating, based on the protein contents of the skim milk, the cream remix portion and the permeate, flow rates that are required for a first skim milk portion, a cream remix portion and the permeate to obtain a predetermined protein content of a mixture of the first skim milk portion, the cream remix portion and the permeate, a control signal output device configured to output the control signals to the set of valves that are arranged to regulate the flow of the first skim milk portion, the cream remix portion and the permeate, such that said calculated flow rates are obtained.

* * * * *